(12) United States Patent
Emmerhoff (10) Patent No.: US 11,125,362 B2
(45) Date of Patent: Sep. 21, 2021

(54) BRAKE TUBE CONNECTOR AND BRAKE TUBE CONNECTOR ASSEMBLY

(71) Applicant: HYDRO EXTRUDED SOLUTIONS AS, Oslo (NO)

(72) Inventor: Ole Johannes Emmerhoff, Torvastad (NO)

(73) Assignee: HYDRO EXTRUDED SOLUTIONS AS, Oslo (NO)

( * ) Notice: Subject to any disclaimer, the term of this patent is extended or adjusted under 35 U.S.C. 154(b) by 379 days.

(21) Appl. No.: 15/767,848

(22) PCT Filed: Oct. 11, 2016

(86) PCT No.: PCT/EP2016/074277
§ 371 (c)(1),
(2) Date: Apr. 12, 2018

(87) PCT Pub. No.: WO2017/064028
PCT Pub. Date: Apr. 20, 2017

(65) Prior Publication Data
US 2018/0313477 A1 Nov. 1, 2018

(30) Foreign Application Priority Data

Oct. 13, 2015 (SE) .................................. 1551317-9

(51) Int. Cl.
*F16L 19/028* (2006.01)
*B60T 17/04* (2006.01)

(52) U.S. Cl.
CPC .......... *F16L 19/028* (2013.01); *B60T 17/043* (2013.01)

(58) Field of Classification Search
CPC ... F16L 19/025; F16L 19/028; F16L 19/0286; B60T 17/043
(Continued)

(56) References Cited

U.S. PATENT DOCUMENTS 5,027,559 A    7/1991  Maspero
5,529,349 A *  6/1996  Gibbs ..................... F16L 19/02
                                                285/332

(Continued)

FOREIGN PATENT DOCUMENTS

CH        526 066 A      7/1972
CH        526066         7/1972
(Continued)

OTHER PUBLICATIONS

International Searching Authority, International Search Report and Written Opinion, corresponding to International Application No. PCT/EP2016/074277, dated Dec. 7, 2016 (2 pages).

(Continued)

*Primary Examiner* — Aaron M Dunwoody
(74) *Attorney, Agent, or Firm* — Loeb & Loeb, LLP (57) ABSTRACT

A brake tube connector including a brake tube with a flare at an end, and a screw. The flare has a front portion with a front abutment surface, a rear portion with a rear abutment surface, and an intermediate portion between. The screw is arranged coaxially with the brake tube with an abutment surface facing the rear abutment surface. The rear portion of the flare has a frustoconical shape and an inclination angle between the rear abutment surface and a radial plane. The screw abutment surface is inwardly inclined at an angle between the screw abutment surface and a radial plane.

18 Claims, 8 Drawing Sheets

(58) Field of Classification Search
USPC .............................. 285/334.5, 384, 382, 385
See application file for complete search history.

(56) References Cited

U.S. PATENT DOCUMENTS

| | | | | |
|---|---|---|---|---|
| 6,130,404 | A * | 10/2000 | Campagna | B23K 26/073 219/121.69 |
| 6,527,304 | B1 * | 3/2003 | Pliassounov | F16L 19/025 285/233 |
| 6,663,146 | B1 * | 12/2003 | Sakai | F16L 19/0286 285/148.26 |
| 7,726,701 | B2 * | 6/2010 | Koji | F16L 19/0286 285/14 |
| 9,797,532 | B2 * | 10/2017 | Makino | B21D 17/025 |
| 2007/0003394 | A1 * | 1/2007 | Carey | F16B 35/047 411/386 |
| 2007/0052236 | A1 * | 3/2007 | Wada | B60T 17/043 285/384 |
| 2009/0015008 | A1 * | 1/2009 | Pliassounov | B60T 17/043 285/331 |
| 2011/0204623 | A1 * | 8/2011 | Weick | F16L 19/0283 285/331 |
| 2014/0001749 | A1 * | 1/2014 | Jensen | B60T 17/043 285/222.1 |
| 2014/0123719 | A1 * | 5/2014 | Lukasak | B21C 23/002 72/253.1 |
| 2015/0354735 | A1 * | 12/2015 | Stahn | F16L 19/028 285/94 |
| 2016/0223107 | A1 | 8/2016 | Berghaus | |

FOREIGN PATENT DOCUMENTS

| | | |
|---|---|---|
| CN | 2067628 | 12/1990 |
| CN | 2493349 | 5/2002 |
| CN | 102873597 | 1/2013 |
| CN | 203993388 | 12/2014 |
| CN | 104259939 | 1/2015 |
| EP | 2 860 433 A1 | 4/2015 |
| FR | 1235078 | 7/1960 |
| JP | H11218269 | 8/1999 |
| JP | 2007100696 | 4/2007 |
| JP | 201459051 | 4/2014 |
| WO | 2013111384 | 8/2013 |
| WO | 2014187675 | 11/2014 |

OTHER PUBLICATIONS

Japanese Office Action (with English language translation) for App. No. JP2018-518457, dated Jul. 10, 2020, 9 pages.
Chinese Office Action (with English translation) for App. No. CN201680055974.7, dated Feb. 20, 2021, 15 pages.

* cited by examiner

Torque: Sensitivity to screw front angle and flare back angle difference;

BRAKE TUBE CONNECTOR AND BRAKE TUBE CONNECTOR ASSEMBLY

CROSS-REFERENCE TO RELATED APPLICATIONS

This application claims priority to International Application No. PCT/EP2016/074277, filed Oct. 11, 2016, which claims priority to Swedish Application SE 1551317-9, filed Oct. 13, 2015, the disclosures of which are incorporated by reference herein.

TECHNICAL FIELD

The present invention relates to a brake tube connector and a brake tube connector assembly for use in vehicle braking systems.

BACKGROUND

Hydraulic fluid systems are commonly used in automotive vehicle braking systems. Such braking systems comprise several component interfaces that must maintain a relatively high brake fluid hydraulic pressure throughout the service life of the braking system. Any leakage of hydraulic brake fluid may cause problems. Threaded connectors are commonly used to attach brake tubing to the various braking system components in the manufacture of such braking systems. Such connectors typically include a screw having external threads arranged around a brake tube having a flared tube end that is inserted into a mating threaded hole in a braking system component, to which the tube is to be attached. Brake tubes and components of brake tube connectors are typically made from steel, however, there is a desire to provide brake tubes and connectors of other materials in order to reduce weight and improve corrosion properties.

SUMMARY

In an embodiment, the a brake tube connector comprises a brake tube having a flare provided at an end thereof, and a screw, wherein the end of the brake tube is rotationally symmetrical around a rotation axis, and the flare comprises a front portion having a front abutment surface, a rear portion having a rear abutment surface, and an intermediate portion arranged between the front portion and the rear portion, and the screw is arranged coaxially with and radially outside the brake tube, and comprises exterior threads and an abutment surface directed towards the rear abutment surface of the flare rear portion. The rear portion of the flare may have a frustoconical shape with an inclination angle ($\gamma_2$), which is the angle between the rear abutment surface and a radial plane, said rear inclination angle ($\gamma_2$) being 3-25°, preferably 8-17°, and the abutment surface of the screw is inwardly inclined at an inclination angle ($\gamma_1$), which is in the angle between the screw abutment surface and a radial plane, said angle ($\gamma_1$) being 3-25°, preferably 8-17°.

The difference between the rear inclination angle ($\gamma_2$) of the flare and the inclination angle ($\gamma_1$) of the screw abutment surface may be less than ±3°, more preferably less than ±1°, and most preferably ±0.5°. The front portion of the flare may have a tapered frustoconical shape having a flare front angle ($\beta$), which is the angle between the front abutment surface (6) and a plane parallel to the rotation axis (A).

Further, the brake tube may comprise an aluminium alloy, preferably an aluminium alloy having a tensile strength of at least 250 MPa, a yield strength of at least 210 MPa, and elongation (A5) of at least 10%. The surface of the front abutment surface of the flare may be free from any coating.

In some embodiments, the screw may have a rounded corner between an interior surface of the screw and the abutment surface, said rounded corner having a radius ($R_s$) of less 0.6 mm, preferably less than 0.1 mm. in addition, the brake tube may preferably have a rounded corner between an exterior surface of the tube and the rear abutment surface, said rounded corner having a radius ($R_t$) of less 0.6 mm, preferably less than 0.1 mm.

In another embodiment, a brake tube connector assembly may comprise the above described brake tube connector and a nut, wherein the nut comprises a cylindrical recess having interior threads and a concave frustoconical abutment surface arranged rotation symmetrically to an axial direction of the nut, wherein the nut is adapted to receive the flare of the brake tube and the screw, so that the interior threads of the nut can engage with the exterior threads of the screw, and the front abutment surface of the flare front portion can come into contact with the concave frustoconical abutment surface of the nut.

The concave frustoconical abutment surface of the nut may have a nut angle ($\alpha$), which may be the angle between the concave frustoconical abutment surface (12) and a plane parallel to the rotation axis of the nut, and wherein the difference between the flare front angle ($\beta$) of the brake tube flare (2), and the nut angle ($\alpha$) of the nut (4) may be less than ±5°, more preferably less than ±1°, most preferably less than ±0.5°.

The intermediate portion of the flare may have a diameter ($d_1$), and the cylindrical recess of the nut (4) may have a diameter ($d_2$), and the difference between the diameter ($d_2$) of the cylindrical recess and the diameter ($d_1$) of the flare may be less than 2.5 mm, more preferably less than 0.5 mm. The intermediate portion may have a flare length, which is the distance in the axial direction of the brake tube between the front portion and the rear portion, wherein the flare length (B) may be 0.3-0.8 mm, more preferably 0.65-0.75 mm.

BRIEF DESCRIPTION OF THE DRAWINGS

Non-limiting and non-exhaustive embodiments are described in reference to the following drawings. In the drawings, like reference numerals refer to like parts through all the various figures unless otherwise specified.

For a better understanding of the present disclosure, a reference will be made to the following detailed description, which is to be read in association with the accompanying drawings, wherein:

FIG. 1b is an enlargement of a portion of FIG. 1a;

DETAILED DESCRIPTION

The automotive industry has shown interest in using aluminum tubes for the brake tubing in their cars. One of the challenges related to connectors for brake tubes is the properties and shape of the tube flare where the brake tubings are connected. It can be important that the tube flare meets the requirements with respect to the torque that is applied during fastening and refastening and the deformations of the brake tube flare that will occur when the connector is sealed. It has been found that the traditional design of brake tube connectors may be less suitable when the brake tube and the flare at the end thereof is made of aluminium, since the material strength in the flare end can be reduced due to the increase in stress in the contact area between the rear surface of the flare and the front abutting surface of the screw component, when the brake connector is sealed.

In some embodiments, the brake tube connector described herein may provide a configuration for the components included in the connector, which may allow the connector to be made of aluminum. In some embodiments, the design provided by the present invention may reduce the risk of material failure in the components and improve the sealing properties of the connector. The present connector design may help ensure that the fitting will provide highest possible fitting torque resistance/capacity for minimum deformation of the tube flaring. Less deformation may ensure that the tube flare fitting properties will remain during several re-work operations.

In some embodiments, the brake tube connector comprises a brake tube and a screw. A brake tube connector assembly is also provided, which comprises a brake tube connector and a nut. The brake tube has a flare provided at an end thereof, which is an integral part of the brake tube and is rotationally symmetrical around a rotation axis (A). The flare comprises a front portion having a front abutment surface, a rear portion having a rear abutment surface, and an intermediate portion arranged between the front portion and the rear portion. The screw may be arranged coaxially with and radially outside the brake tube, and may comprise exterior threads and an abutment surface directed towards the rear abutment surface of the flare rear portion. The rear portion of the flare may have a frustoconical shape with an inclination angle ($\gamma_2$), which is the angle between the rear abutment surface and a radial plane. The abutment surface of the screw is inwardly inclined at an inclination angle ($\gamma_1$), which may be the angle between the screw abutment surface and a radial plane. The rear inclination angle ($\gamma_2$) of the flare may be 3-25°, preferably 8-17°, and the inclination angle ($\gamma_1$) of the screw may be 3-25°, preferably 8-17°. The inclined abutment surfaces of the flare and the screw may reduce the deformation, and thus the stress in the tube material, when torque is applied and the connector is fastened to a nut in a connector assembly.

In some embodiments, the difference between the rear inclination angle ($\gamma_2$) of the flare and the inclination angle ($\gamma_1$) of the screw abutment surface may be less than ±3°, preferably less than ±1°, more preferably ±0.5°. By minimizing the difference in inclination between the screw abutment surface and the rear abutment surface of the flare, the deformation and stress in the tube material may be further reduced when torque is applied.

The front portion of the flare may have a tapered frustoconical shape having a flare front angle (β), which is the angle between the front abutment surface and a plane parallel to the rotation axis. When the passageway channel of the tube is cylindrical, the plane parallel to the rotation axis is tangential to the inner surface of the tube. By providing a tapered frustoconical front portion, the front abutment surface connects directly to the cylindrical interior surface of the brake tube, without any further intermediate portion at the front of the flare. This allows for improved contact and less deformation of the tube material, when the brake tube connector is assembled with a nut having a recess adapted to receive the flare and the screw.

The brake tube connector may connect in a brake tube connector assembly, which further comprises a nut. The nut comprises a cylindrical recess having interior threads and a concave frustoconical abutment surface arranged rotation symmetrically to an axial direction of the nut. The abutment surface of the nut is thus tapered, with its narrowest end facing away from the cylindrical recess. The nut may be adapted to receive the screw and the flare of the brake tube, so that the interior threads of the nut can engage with the exterior threads of the screw, and the front abutment surface of the flare front portion can come into contact with the abutment surface of the nut. The concave frustoconical abutment surface of the nut has a nut angle (α), which is the angle between the concave frustoconical abutment surface and a plane parallel to the rotation axis of the nut. The difference between the flare front angle (β) of the brake tube flare, and the nut angle (α) of the nut is less than ±5°, preferably less than ±1°, more preferably less than ±0.5°. By minimising the difference in inclination between the nut abutment surface and the front abutment surface of the flare, the deformation and stress in the tube material can be further reduced when torque is applied.

The radial height of the flare may be as a large as the nut allows for. The height of the flare is the diameter of the flare outside of the outer diameter of the tube. The widest portion of the flare is in the area of the intermediate portion, which is positioned between the front portion and the rear portion. Thus, the difference between the diameter of the cylindrical recess and the diameter of the intermediate portion of the flare is preferably less than 2.5 mm, preferably less than 0.5 mm. this allows harder tightening of the screw without increased deformation.

The intermediate portion of the flare has a flare length, which is the distance in the axial direction of the brake tube between the front portion and the rear portion. The flare length should preferably be as small as the axial pull allows for, and is preferably 0.3-0.8 mm, more preferably 0.65-0.75 mm.

The screw of brake tube connector preferably has a rounded corner between an interior surface of the screw and the abutment surface, having a radius ($R_s$) of less 0.6 mm, preferably less than 0.1 mm. The brake tube preferably has a rounded corner between an exterior surface of the tube and the rear abutment surface, having a radius ($R_t$) of less 0.6 mm, preferably less than 0.1 mm.

Brake tubes have traditionally been made from steel or copper. It is desired to use aluminium due to its low weight and good corrosion resistance. However, aluminium has lower mechanical strength than steel, and has thus hitherto been avoided for use in brake tubes due to the risk of material failure in brake tube connections. The present brake tube connector design allows the brake tube to be made of an aluminium alloy, since it can efficiently seal the brake tube and the screw without severe deformation of the brake tube flare. The aluminium alloy preferably has a tensile strength of at least 250 MPa, a yield strength of at least 210 MPa, and elongation (A5) of at least 10%, in order to avoid local stress to minimise the risk for cracks in the material, which may lead to leakage. The screw and the nut may be made of steel or any other suitable material.

Further, the surface of the front abutment surface of the flare is preferably free from any coating.

A suitable aluminium alloy for manufacture of the brake tube is described in US2014123719. Such alloy comprises from about 0.7 to about 1.3 wt-% silicon, up to about 0.50 wt-% iron, from about 0.03 to about 0.2 wt-% copper, up to about 0.5 wt-% manganese, from about 0.6 to about 1.2 wt-% magnesium, up to about 0.05 wt-% chromium, up to about 0.2 wt-% zinc, up to about 0.10 wt-% titanium, and the balance consisting essentially of aluminium and incidental elements and impurities.

Figure 1A:
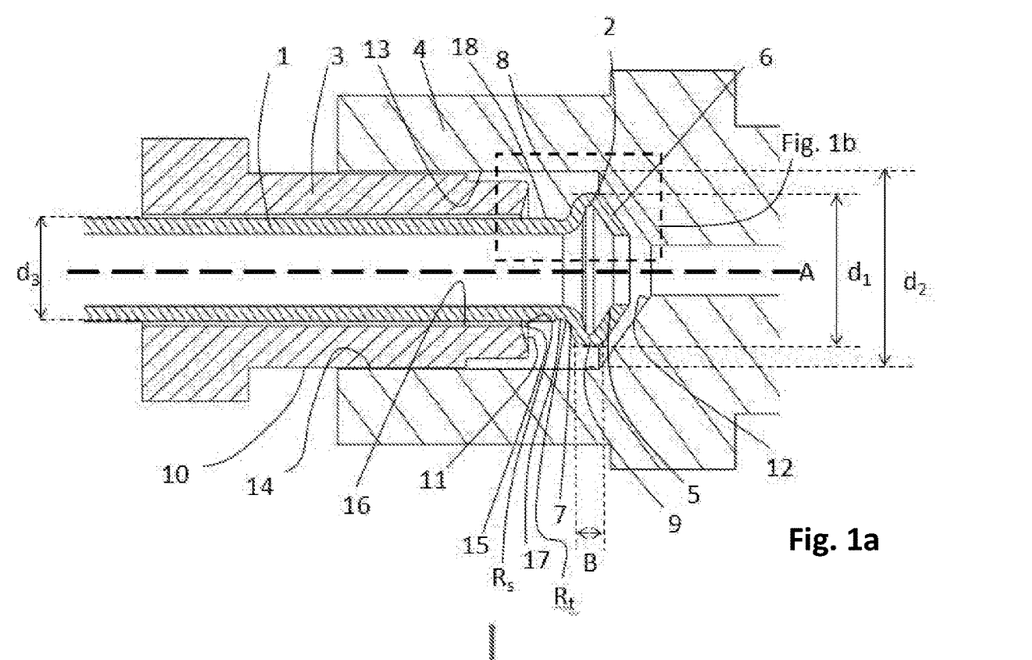
FIG. 1a is a schematic cross-sectional view of an embodiment of a brake tube connector and a nut, which together form a brake tube connector assembly according to the present application.
Figure 1B:
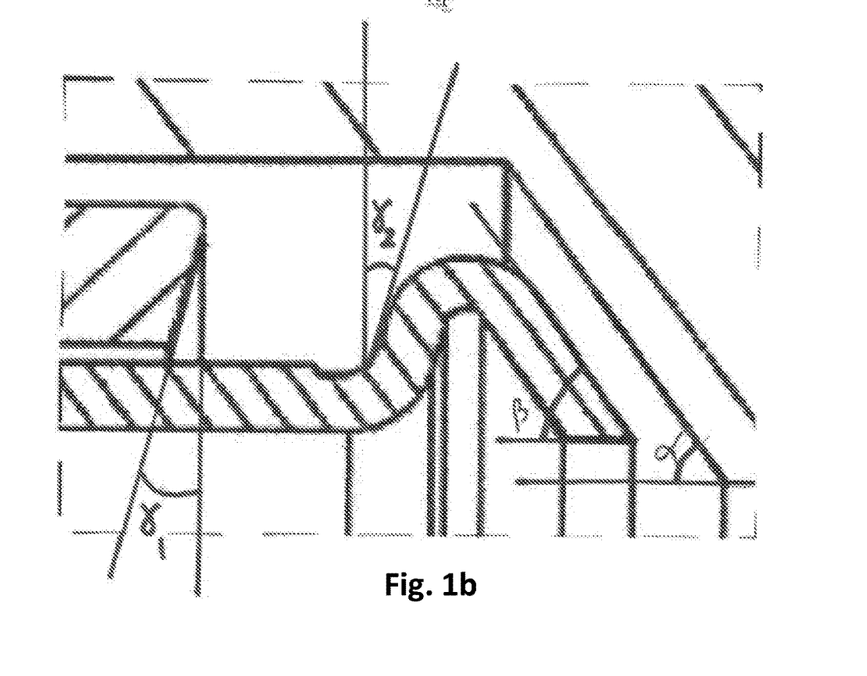
Figure 2:
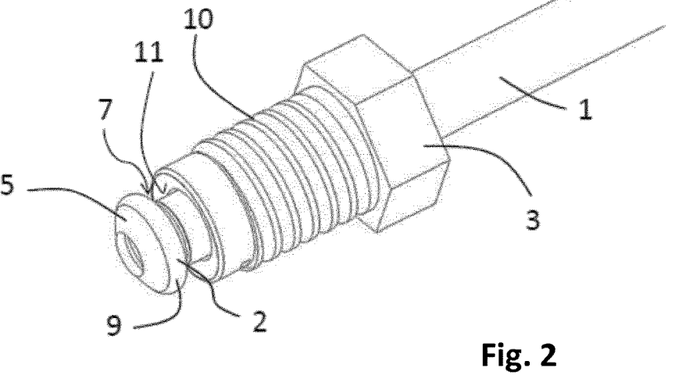
FIG. 2 is a perspective view of the brake tube connector.

A schematic view of a brake tube connector is shown in FIGS. 1a and 1b. The brake tube connector is shown in a perspective view in FIG. 2. FIG. 1 shows schematically a cross-section of an embodiment of the brake tube connector, which comprises a brake tube (1) having a flare (2) provided at an end thereof. The end of the brake tube is rotationally symmetrical around a rotation axis (A), and comprises a front portion (5) having a front abutment surface (6), a rear portion (7) having a rear abutment surface (8), and an intermediate portion (9) arranged between the front portion (5) and the rear portion (7). The rear portion (7) of the flare has a frustoconical shape with an inclination angle ($\gamma_2$), which is the angle between the rear abutment surface (8) and a radial plane, said rear inclination angle ($\gamma_2$) being 3-25°, preferably 8-17°. In the shown embodiment, the front portion (5) of the flare has a tapered frustoconical shape having a flare front angle ($\beta$), which is the angle between the front abutment surface (6) and a plane parallel to the rotation axis (A).

The brake tube preferably has a rounded corner (17) between an exterior surface (18) of the tube and the rear abutment surface (8), said rounded corner having a radius ($R_t$) of less 0.6 mm, preferably less than 0.1 mm.

The brake tube connector also comprises a screw (3), arranged coaxially with and radially outside the brake tube (1), and comprising exterior threads (10). The screw has an abutment surface (11) directed towards the rear abutment surface (8) of the flare rear portion (7). The abutment surface (11) of the screw (3), is inwardly inclined at an inclination angle ($\gamma_1$), which is in the angle between the screw abutment surface (11) and a radial plane, said angle ($\gamma_1$) being 3-25°, preferably 8-17°. The difference between the rear inclination angle ($\gamma_2$) of the flare and the inclination angle ($\gamma_1$) of the screw abutment surface is preferably less than ±3°, more preferably less than ±1°, most preferably ±0.5°.

The screw preferably has a rounded corner (15) between an interior surface (16) of the screw and the abutment surface (11), said rounded corner having a radius ($R_s$) of less 0.6 mm, preferably less than 0.1 mm.

FIGS. 1a and 1b also shows the nut, which together with the brake tube connector forms a brake tube connector assembly. The nut (4) comprises a cylindrical recess (13) having interior threads (14) and a concave frustoconical abutment surface (12) arranged rotation symmetrically to an axial direction (A) of the nut. The nut (4) being adapted to receive the flare (2) of the brake tube and the screw (3), so that the interior threads (14) of the nut can engage with the exterior threads (10) of the screw, and the front abutment surface (6) of the flare front portion (5) can come into contact with the concave frustoconical abutment surface (12) of the nut.

The concave frustoconical abutment surface (12) of the nut has a nut angle ($\alpha$), which is the angle between the concave frustoconical abutment surface (12) and a plane parallel to the rotation axis (A) of the nut. The difference between the flare front angle ($\beta$) of the brake tube flare (2), and the nut angle ($\alpha$) of the nut (4) is preferably less than ±5°, more preferably less than ±1°, most preferably less than ±0.5°.

The intermediate portion (9) of the brake tube flare has a diameter ($d_1$), and the cylindrical recess (13) of the nut (4) has a diameter ($d_2$), and the difference between these diameters ($d_2$) and ($d_1$) of the flare is preferably less than 2.5 mm, preferably less than 0.5 mm.

Further, the intermediate portion (9) of the brake tube has a preferably flare length (B), being the distance in the axial direction (A) of the brake tube between the front portion (5) and the rear portion (7), and the flare length (B) is preferably 0.3-0.8 mm, more preferably 0.65-0.75 mm.

Tests have been performed related to the above described brake tube connector, made from a high strength aluminium having a tensile strength above 250 MPa and a yield strength above 210 MPa. In order to be able to study the properties of the brake tube connector, a numerical model of the brake-line connection has been developed, using the finite element code MSC Marc. The model calculates the forces and deformations of the tube when torque is applied to the screw. The model is made axi-symmetrical due to the complexity of a full 3D model, which means that the threads and the rotation of the screw are accounted for in an approximate manner via pure axial translation of the screw. The translation and axial force acting on the screw can thus be related to the rotation and torque during tightening of the screw.

The torque consists of three contributions:
Friction between tube and screw, $T_F$.
Friction in threads, $T_T$.
Deformation work of flare, $T_D$.

$T_D$ is the torque that would remain if all friction in threads and between screw and flare were absent. The total torque T that is required to tighten the brake-line can thus be written: $T=T_F+T_T+T_D$.

These contributions to the torque depend on the axial force acting on the screw, and the dependencies for the two first contributions were determined by suitable experiments, described in the following section, while the latter contribution is given by: $T_D=(\Delta s/2\pi)\cdot F$, where s is the slope of the threads and F is the axial force.

The relevant dimensions of the tube, screw and nut were parameterized in the model in order to perform sensitivity studies. Both the elastic and plastic behaviour of the material was considered, using the Mises criteria for yield and a uniformly distributed yield stress.

The contact surfaces between the tube-screw and tube-mutter were modelled by Coulomb friction. There is no relative rotation between tube and nut, hence the friction in the axial/radial direction here is relatively large. The contact between tube and screw is dominated by a large relative rotation, which gives a relatively small friction in the axial/radial direction.

The mechanism of fastening of brake-lines occurs in two fairly distinctive stages. The first stage is when the front faces of the flare and the nut, and the back of the flare and the screw, establish contact. If there is a difference between the angles $\alpha$ and $\beta$, shown in FIG. 1, the flare will undergo a bending mode before the two surfaces have gained full contact. This can result in some choking of the inner radius of the tube at the front during this stage, depending on the difference between the angles $\alpha$ and $\beta$. The larger the difference is, the more choke. The second stage involves the compression of the flare. During this stage, the flare expands radially and the outer diameter of the flare increases. An inclination of the abutment surface at the front of the screw front (the angle $\gamma_1$) and small length (B) of the flare reduces the expansion of the flare, since the flare is prevented from 'flowing' outwards and there is a large surface area relative to the volume of the flare.

Two methods were used to measure the thread friction and the friction between screw and flare in order to calculate the torque associated with the tightening of brake-tubes.

Figure 3:
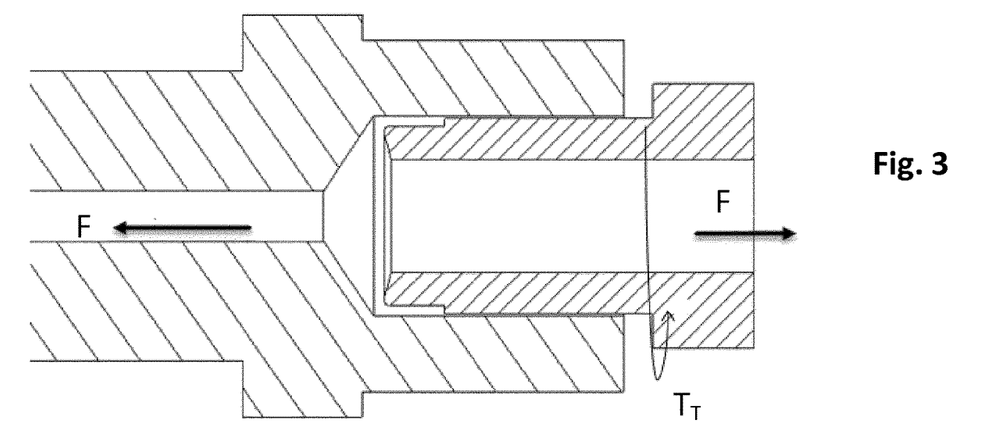
FIG. 3 schematically illustrates an experiment set-up to determine friction in threads.
Figure 5:
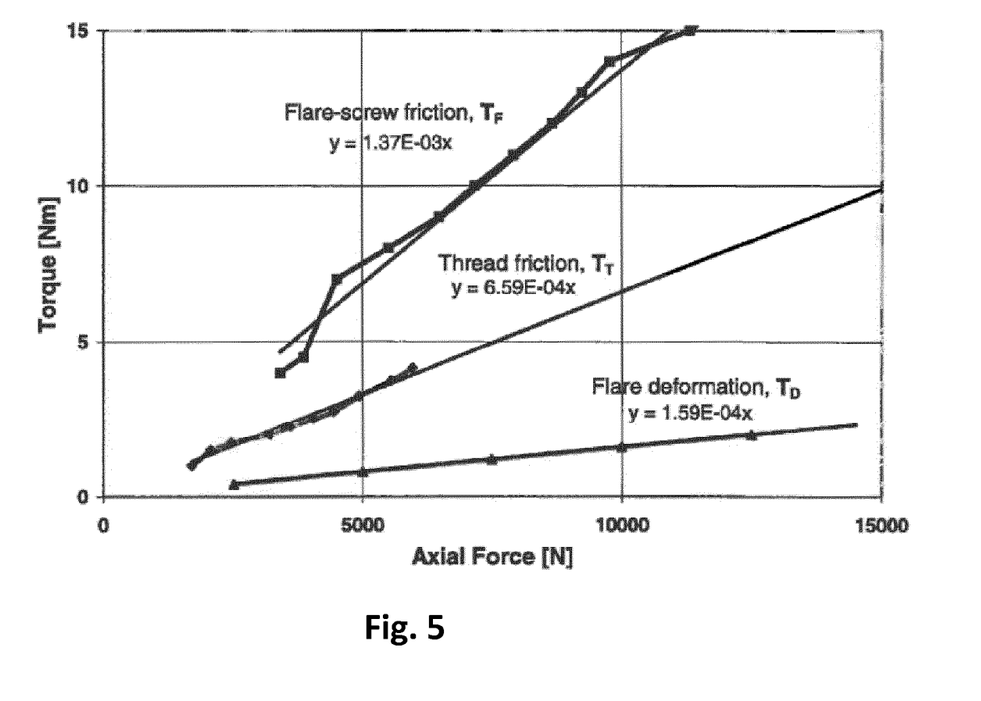
FIG. 5 is a diagram showing contributions to torque as a function of axial force F on the screw.

The first experiment involved only the screw and nut as illustrated in FIG. 3. An axial force F was applied to the screw and nut and the resulting torque $T_T$ from rotating the screw was measured for a range of values of F. The specification of the screw and nut and the relation between F and $T_T$ is shown in FIG. 5, which shows measured contributions to torque as a function of axial force F on the screw. The measurements are based on a flare with the following parameters: B=1.5 mm, $\alpha-\beta=5°$, yield stress=310 and Y=0. The equations show the relationship between axial force (x) and torque (y).

Figure 4:
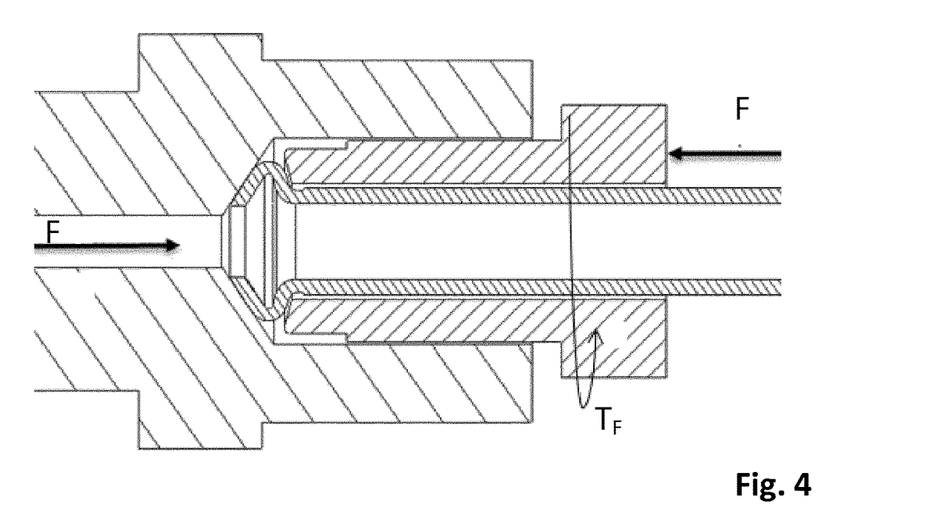
FIG. 4 schematically illustrates an experiment set-up to determine friction between flare and screw.

The second experiment was to determine the friction between the screw and the tube acting on the front of the screw. The set-up is illustrated in FIG. 4, where all parts are identical to the real brake tube except for the threads, which were removed. The nut was fixed, whereas an axial force F and a torque $T_F$ were applied simultaneously to the screw, and were recorded for a range of values of F.

A number of parameters were studied in order to evaluate an optimal shape of the flare and screw, and necessary material properties of the tube. The yield stress of the tube material was calculated, assuming an isotropic distribution throughout the tube. If the material work hardens during deformation, the yield stress will be higher in the flare than in the rest of the tube.

Figure 6:
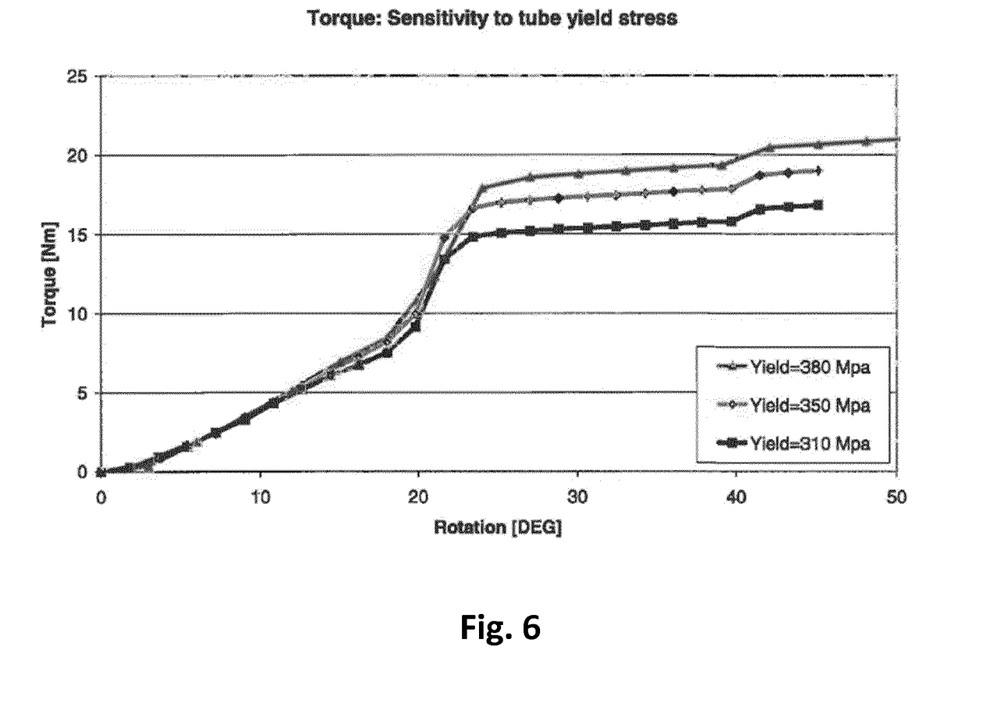
FIG. 6 is a diagram showing torque and rotation of a screw for different yield stresses of the tube.

The results of the sensitivity study are presented in terms of curves for the torque applied to the screw vs. its rotation, and contour plots of the plastic deformation of the flare. FIG. 6 shows torque and rotation of the screw for different yield stresses of the tube. The flare length was B=1 mm and front angle difference: $\alpha-\beta=1°$. The first slope from 0 to 20 degrees rotation is related to the bending mode of the flare. The increase in slope from 20 to 25 degrees rotation starts when full contact is obtained between screw/flare and nut/flare. The curves level out from 25 degrees rotation and beyond, where the flare starts to deform and expand radially.

Figure 7:
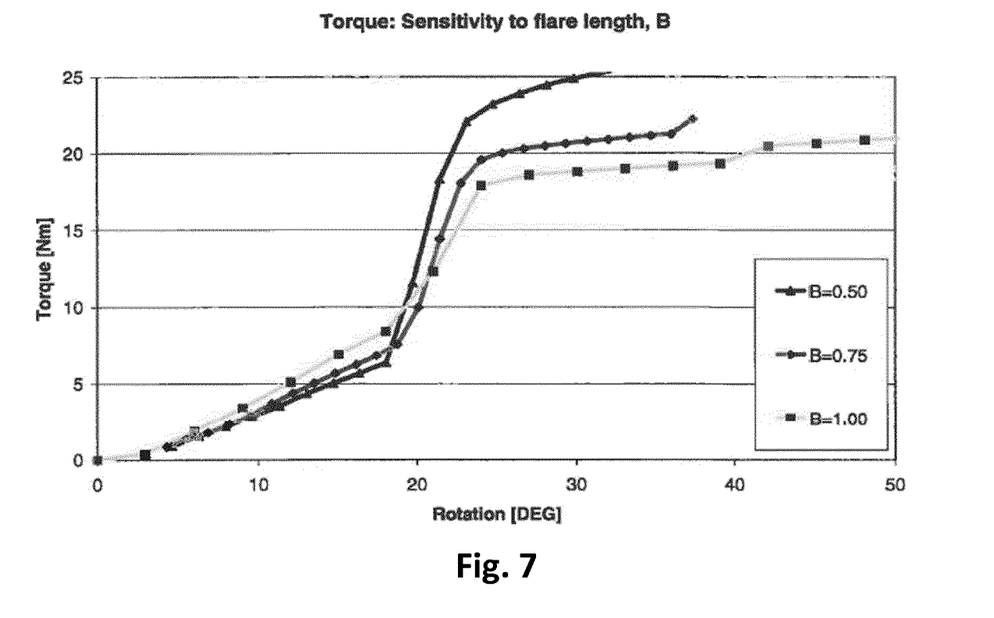
FIG. 7 is a diagram showing torque and rotation of a screw for different lengths of the flare.

The length of the flare has a significant effect on the torque. A small flare has more area per volume than a large flare, and therefore dominates friction which results in more resistance against deformation. FIG. 7 shows torque and rotation of screw for different flare lengths B. Yield stress: 380 MPa and front angle difference: $\alpha-\beta=1°$.

Figure 8:
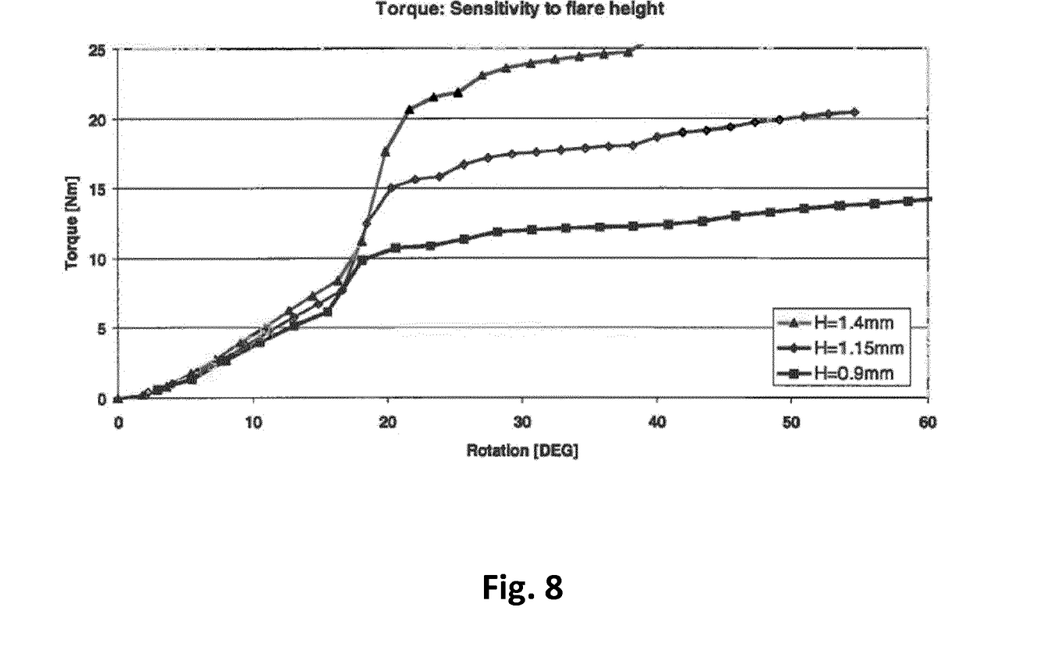
FIG. 8 is a diagram showing torque and rotation for different flare heights.

The flare diameter has a significant influence on the torque, and it is important that the maximum height that the nut allows for is utilized. The height (H) is correlated to the diameter $d_1$ of the flare, and is the diameter $d_1$ of the flare minus the outer diameter $d_3$ of the tube, divided by two, i.e. $H=(d_1-d_3)/2$. FIG. 8 shows torque and rotation of screw for different flare heights H.

Figure 9:
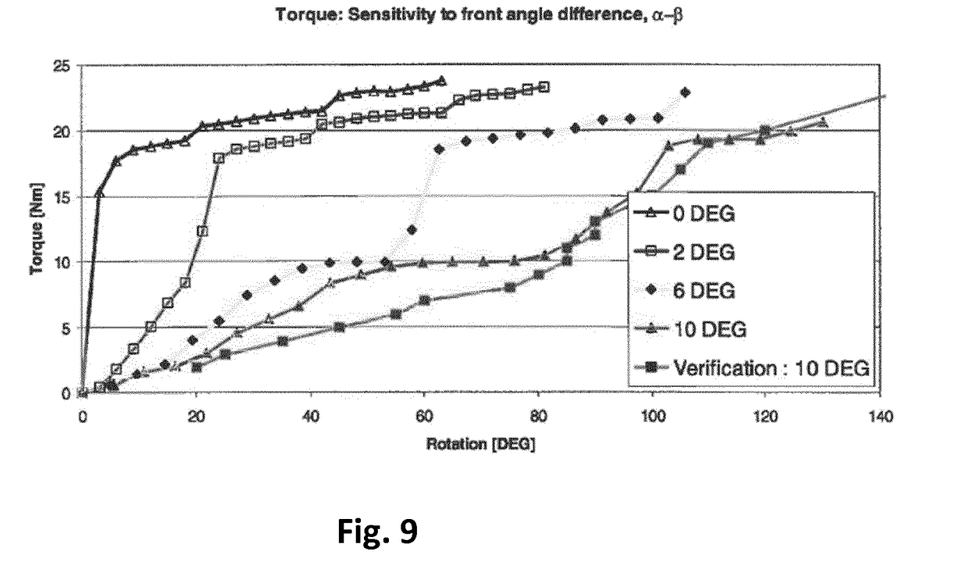
FIG. 9 is a diagram showing torque and rotation for different angles (α-β) between front of flare and nut.
Figure 10:
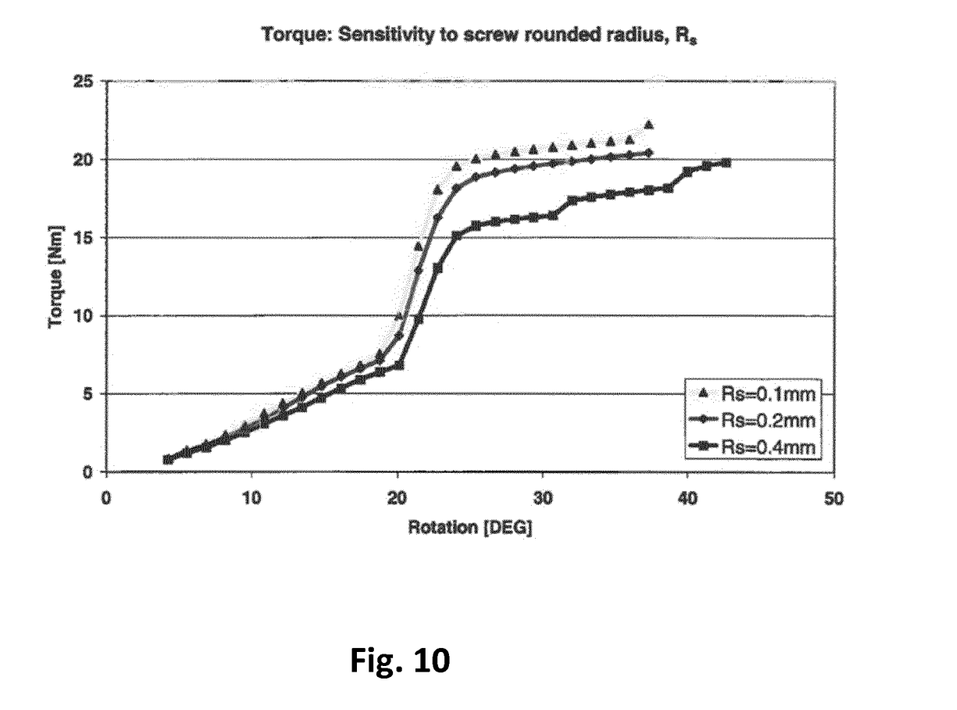
FIG. 10 is a diagram showing torque and rotation for different radii, Rs of the rounded corner at inside of screw.
Figure 11:
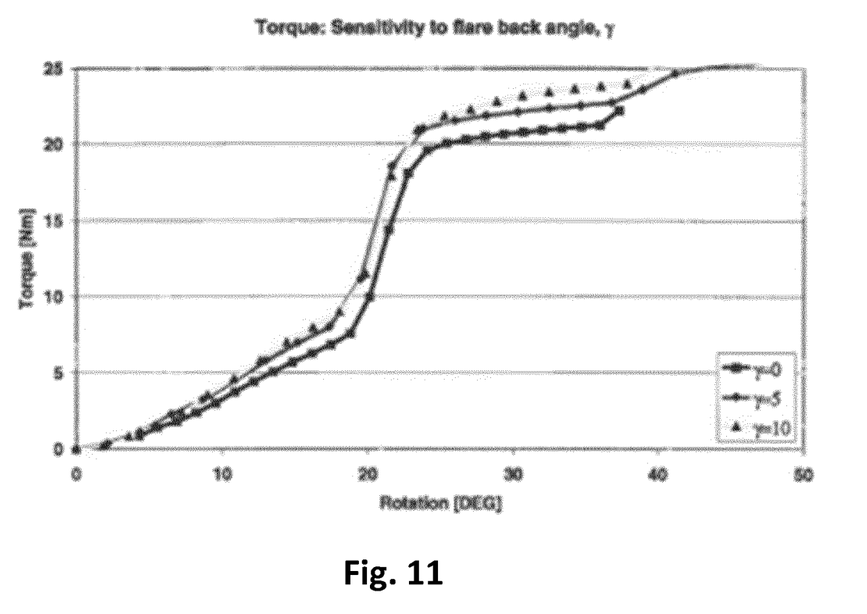
FIG. 11 is a diagram showing torque and rotation for different flare rear inclination angles.
Figure 13:
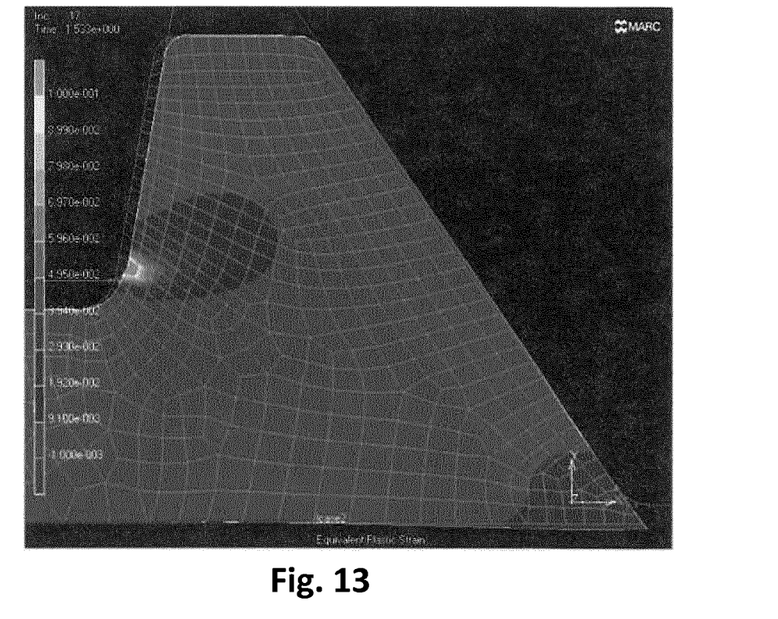
FIG. 13 shows the plastic deformation at 14 Nm torque for the most preferred flare design.

The amount of rotations of the screw increases significantly for increasing values of $\alpha-\beta$, i.e. for increasing mismatch between the front of the flare and the nut. These large rotations also result in large deformations of the flare, as shown in FIGS. 11 and 13. FIG. 9 shows torque and rotation of screw for different angles ($\alpha-\beta$) between front of flare and nut. The tested differences were 0, 1, 3 and 5 degrees. In FIG. 9, the double value is indicated, i.e. $2\alpha-2\beta$ being 0, 2 6 or 10. Yield stress: 310 MPa and flare length: 1 mm The radius of the rounded corner of the screw, $R_s$, affects the torque as well. It should not be too small, since a sharp corner may increase the chance of initiating cracks for fatigue. The preferred radius ($R_s$) is less than 0.6 mm, preferably less than 0.1 mm. FIG. 10 shows torque and rotation of screw for different radii, $R_s$ of the rounded corner at the inside of the screw. Yield stress: 380 MPa and flare length: 0.75 mm.

The back angle has a small but positive effect on the torque. The difference is most pronounced for large rotations of the screw. The positive effect is mostly related to the increased resistance of radial expansion of the flare. FIG. 11 shows torque and rotation of the screw for different flare rear inclination angles, where $\gamma=\gamma_1=\gamma_2$. Yield stress: 380 MPa and flare length: 0.75 mm.

Figure 12:
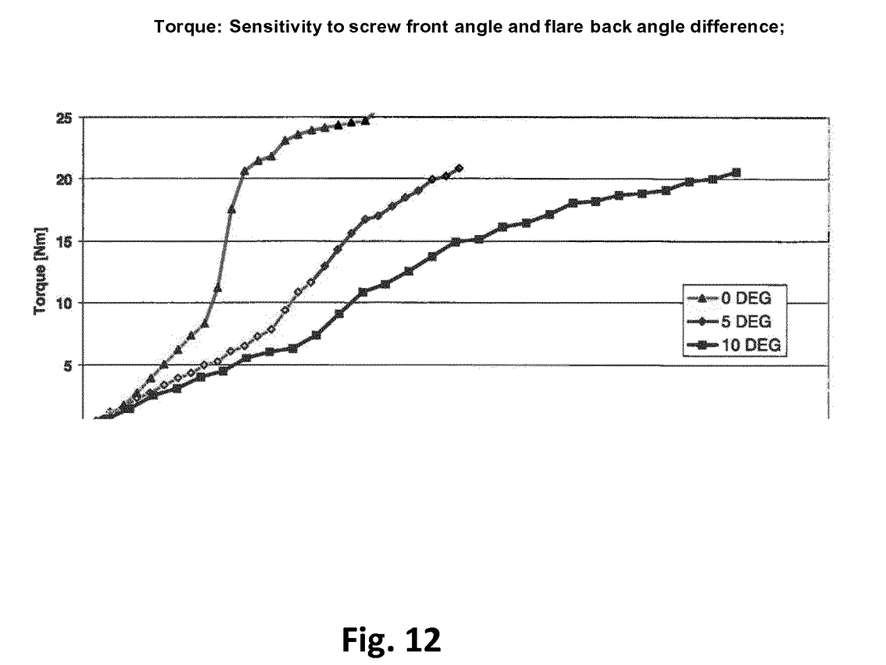
FIG. 12 is a diagram showing torque and rotation for different differences between flare back angle and screw front angle.

As for the front angles, the match between the screw front and back of the flare is essential to gain maximum torque for minimum deformation of the flare. If there is a mismatch between these surfaces, there will be large local deformations, and less torque for the same deformations, shown in FIG. 12. FIG. 12 shows the torque and rotation of the screw for different differences between flare rear inclination angle and screw front angle $\gamma_1-\gamma_2$ where the flare rear inclination angle was constant; $\gamma_2=10°$.

Figure 14:
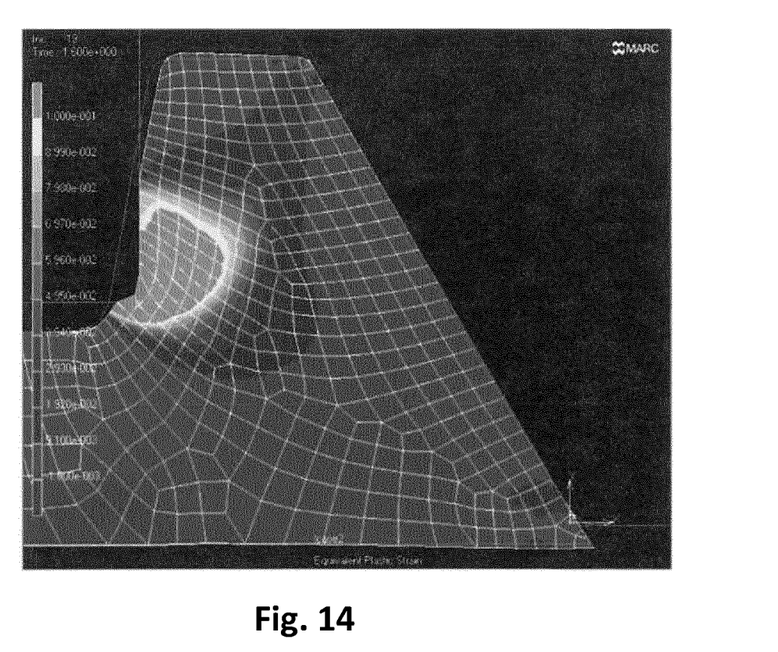
FIG. 14 shows plastic deformation at 14 Nm torque for a flare where γ1−γ2=10° and B=0.75 mm.
Figure 15:
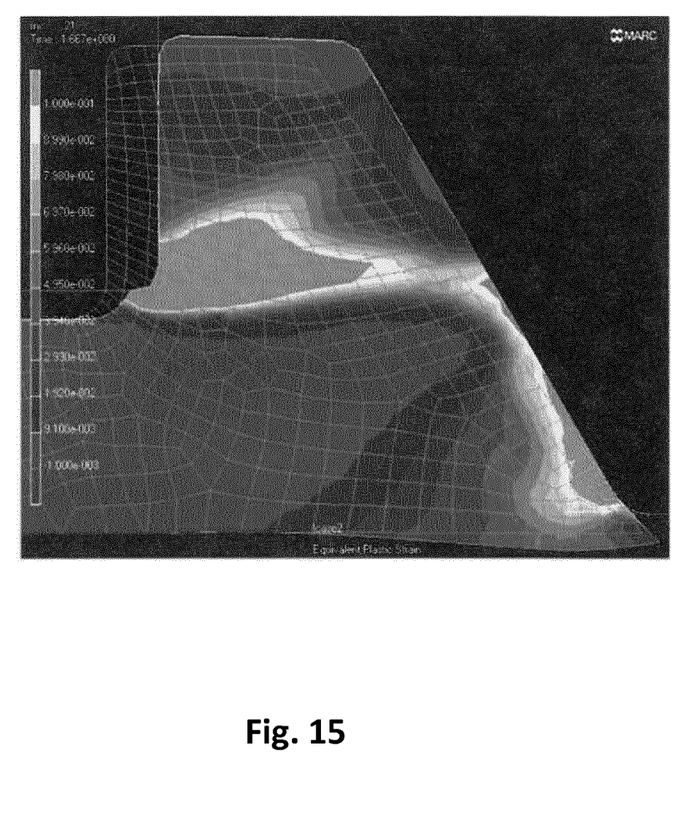
FIG. 15 shows plastic deformation at 14 Nm torque, for a flare where α−β=5° and B=1 mm.

The plastic strain, i.e. the deformation of the flare, for different flare shapes is shown in FIGS. 13-15. The original shape is indicated by the mesh. FIG. 13 shows the most preferred flare shape, whereas the effects of using less preferred parameters, which give larger deformations, are shown in FIGS. 14-15.

FIG. 13 shows plastic deformation at 14 Nm torque, for a flare of the most preferred flare design. FIG. 14 shows plastic deformation at 14 Nm torque for a flare where $\gamma_1-\gamma_2=10°$ and B=0.75 mm. The flare deformation is relatively large due to the mismatch between the screw and the flare. FIG. 15 shows plastic deformation at 14 Nm torque, for a flare where $\alpha-\beta=5°$ and B=1 mm. The flare deformation is relatively large due to the bending of the front.

The pressure is very large near the top of the flare. The amplitude of the pressure at the tip of the flare front portion is largely dependent on the value of $\alpha-\beta$. For $\alpha-\beta=0$, i.e. identical angle of flare and nut, the amplitude is small, whereas a small difference, e.g. $\alpha-\beta=1°$, results in a pressure, which may be desirable for sealing purposes.

What is claimed is:

1. A brake tube connector comprising;
a brake tube including a flare disposed at an end of the brake tube, the brake tube being made of an aluminum alloy having a tensile strength of at least 250 MPa, a yield strength of at least 210 MPa, and elongation of at least 10%; and
a screw;
wherein the flare is rotationally symmetrical around a rotation axis, the flare comprising:
a front portion including a front abutment surface,
a rear portion including a rear abutment surface, and
an intermediate portion disposed between the front portion and the rear portion;
wherein the screw is disposed coaxially with and radially outside the brake tube, the screw comprising exterior threads and an abutment surface directed towards the rear abutment surface of the flare rear portion;
wherein the rear portion of the flare includes a frustoconical shape with a rear inclination angle measured between the rear abutment surface and a radial plane, the rear inclination angle being between about 3 degrees and about 25 degrees; and
wherein the abutment surface of the screw is inwardly inclined at a screw inclination angle measured between the screw abutment surface and the radial plane, the screw inclination angle being between about 3 degrees and about 25 degrees.

2. The brake tube connector of claim 1, wherein the difference between the rear inclination angle of the flare and the screw inclination angle of the screw abutment surface is less than 3 degrees.

3. The brake tube connector of claim 1, wherein the front portion of the flare includes a tapered frustoconical shape having a flare front angle measured between the front abutment surface and a plane parallel to a rotation axis.

4. The brake tube connector of claim 1, wherein the surface of the front abutment surface of the flare is free from any coating.

5. The brake tube connector of claim 1, wherein the screw has a rounded corner between an interior surface of the screw and the abutment surface, the rounded corner having a radius of less than 0.6 mm.

6. The brake tube connector of claim 1, wherein the brake tube has a rounded corner between an exterior surface of the brake tube and the rear abutment surface, the rounded corner having a radius of less than 0.6 mm.

7. The brake tube connector of claim 1, wherein the rear inclination angle is between about 8 degrees and about 17 degrees.

8. The brake tube connector of claim 1, wherein the screw inclination angle is between about 8 degrees and about 17 degrees.

9. The brake tube connector of claim 1, wherein the screw has a rounded corner between an interior surface of the screw and the abutment surface, the rounded corner having a radius of less than 0.1 mm.

10. The brake tube connector of claim 1, wherein the brake tube has a rounded corner between an exterior surface of the brake tube and the rear abutment surface, the rounded corner having a radius of less than 0.1 mm.

11. A brake tube connector assembly comprising:
a brake tube including a flare disposed at an end of the brake tube, the flare being rotationally symmetrical around a rotation axis and comprising a front portion including a front abutment surface, a rear portion including a rear abutment surface, and an intermediate portion disposed between the front portion and the rear portion, wherein the brake tube is made of an aluminum alloy having a tensile strength of at least 250 MPa, a yield strength of at least 210 MPa, and elongation of at least 10%;
a screw disposed coaxially with and radially outside the brake tube, the screw comprising exterior threads and an abutment surface directed towards the rear abutment surface of the flare rear portion; and
a nut comprising a cylindrical recess including interior threads and a concave frustoconical abutment surface arranged rotation symmetrically to an axial direction of the nut, the nut being configured to receive the flare of the brake tube and the screw such that the interior threads of the nut engage with the exterior threads of the screw, and the front abutment surface of the flare front portion contacts the concave frustoconical abutment surface of the nut;
wherein the rear portion of the flare includes a frustoconical shape with a rear inclination angle measured between the rear abutment surface and a radial plane, the rear inclination angle being between about 3 degrees and about 25 degrees; and
wherein the abutment surface of the screw is inwardly inclined at a screw inclination angle measured between the screw abutment surface and the radial plane, the screw inclination angle being between about 3 degrees and about 25 degrees.

12. The brake tube connector assembly of claim 11, wherein the concave frustoconical abutment surface of the nut has a nut angle measured between the concave frustoconical abutment surface and a plane parallel to the rotation axis of the nut, and wherein the front portion of the flare includes a tapered frustoconical shape having a flare front angle measured between the front abutment surface and a plane parallel to a rotation axis, and wherein the difference between the flare front angle of the flare and the nut angle of the nut is less than 5 degrees.

13. The brake tube connector assembly of claim 12, wherein the difference between the flare front angle of the flare and the nut angle of the nut is less than 1 degree.

14. The brake tube connector assembly of claim 12, wherein the intermediate portion of the flare has a diameter, and the cylindrical recess of the nut has a diameter, wherein the difference between the diameter of the cylindrical recess and the diameter of the flare is less than 2.5 mm.

15. The brake tube connector assembly of claim 14, wherein the difference between the diameter of the cylindrical recess and the diameter of the flare is less than 0.5 mm.

16. The brake tube connector assembly of claim 12, wherein the intermediate portion has a flare length measured in the axial direction of the brake tube between the front portion and the rear portion, and wherein the flare length is between about 0.3 mm and about 0.8 mm.

17. The brake tube connector assembly of claim 16, wherein the flare length is between about 0.65 mm and about 0.75 mm.

18. The brake tube connector assembly of claim 12, wherein the rear inclination angle is between about 8 degrees and about 17 degrees and the screw inclination angle is between about 8 degrees and about 17 degrees.

* * * * *